(12) United States Patent
Bello

(10) Patent No.: US 6,303,856 B1
(45) Date of Patent: *Oct. 16, 2001

(54) AERIAL CABLE SPACER WITH ANTI-DISLODGING CABLE RETAINER

(75) Inventor: Salvatore Bello, Nashua, NH (US)

(73) Assignee: Hendrix Wire & Cable, Inc., Milford, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,421

(22) Filed: Jul. 29, 1998

(51) Int. Cl.$^7$ ....................................................... H02G 7/06
(52) U.S. Cl. ................................ 174/41; 174/43; 174/44; 174/146
(58) Field of Search ................................ 174/43, 44, 145, 174/146, 147, 144, 41; 403/105, 107

(56) References Cited

U.S. PATENT DOCUMENTS

| | | | |
|---|---|---|---|
| 2,831,915 | 4/1958 | Prowant | 174/158 |
| 3,021,382 | 2/1962 | Horrocks et al. | 174/174 |
| 3,456,066 | 7/1969 | Petze, Jr. | 174/146 |
| 3,516,631 | 6/1970 | Santucci | 248/71 |
| 4,020,277 | 4/1977 | LaChance, Sr. et al. | 174/146 |
| 4,047,353 | * 9/1977 | Aarons | 52/713 |
| 4,082,917 | 4/1978 | Hendrix | 174/146 |
| 4,128,918 | 12/1978 | Wenk | 24/16 R |
| 4,439,896 | 4/1984 | Matsiu | 24/16 PB |
| 4,609,171 | 9/1986 | Matsui | 248/74.3 |
| 4,669,688 | 6/1987 | Itoh et al. | 248/74.2 |
| 4,682,748 | 7/1987 | Freudenmann et al. | 248/73 |
| 4,840,345 | 6/1989 | Neil et al. | 248/74.2 |
| 5,021,612 | 6/1991 | Joffe | 174/146 |

* cited by examiner

Primary Examiner—Dean A. Reichard
Assistant Examiner—W. David Walkenhorst
(74) Attorney, Agent, or Firm—Piper Marbury Rudnick & Wolfe

(57) ABSTRACT

An aerial cable spacer is provided with an anti-dislodging cable retainer. The anti-dislodging cable retainer includes a cable seat. Adjacent the cable seat on one side are ratchet teeth and a guide. Adjacent the cable on the opposite side is a slot. The slot receives a retaining arm. At the end of the retaining arm is a ratchet tooth for engagement with the ratchet teeth. The end of the arm also includes either an abutment or groove to engage the guide and to maintain the engagement of the ratchet tooth with the ratchet teeth.

19 Claims, 5 Drawing Sheets

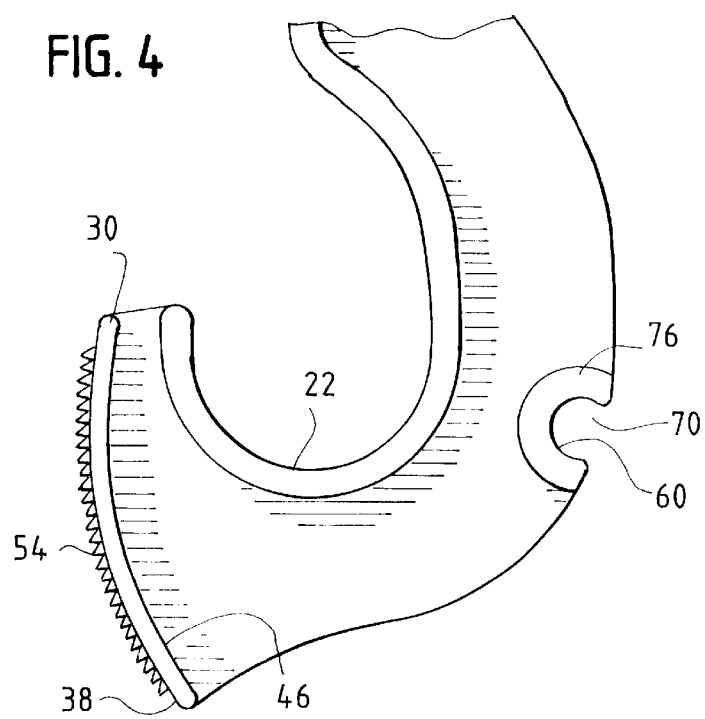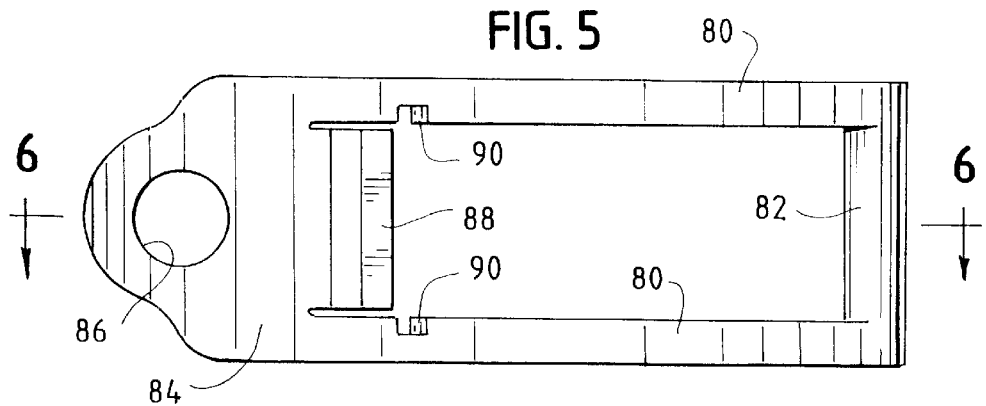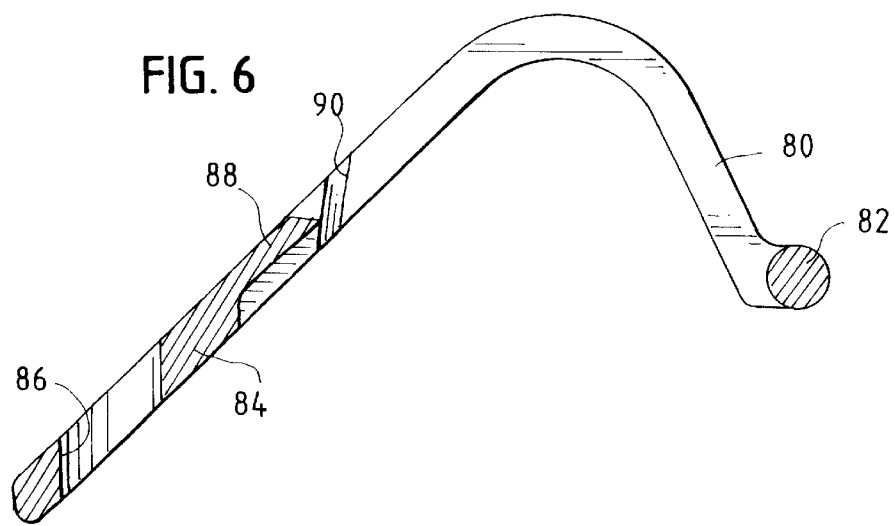

AERIAL CABLE SPACER WITH ANTI-DISLODGING CABLE RETAINER

FIELD OF THE INVENTION

The invention relates to spacers for aerial cables for supporting one or more cables above the ground, and more particularly to an anti-dislodging cable retainer for aerial cable spacers.

BACKGROUND OF THE INVENTION

Overhead conductor cables are commonly suspended from a messenger cable typically made of high strength alloys. The messenger cable is supported on poles or towers with the conductor cable spacers arranged at spaced intervals along the messenger cable to suspend one or more conductor cables. Since many power circuits require three phase electric power, it is often convenient to suspend conductor cables in groups of three. A spacer supports all three conductor cables and simultaneously maintains the conductors in spaced relation.

If the advantages of suspending conductors in this manner are to be fully availed, it is essential that the spacer be easily attached to the messenger cable and to the conductor cables. To provide ease of attaching the spacer to the cables and to reduce the number of parts required, the means for retaining the cables in their respective seats of the spacer should accommodate cables of varying cross sectional diameters without requiring bushings, sleeves, grommets or the like.

The construction of the spacer should be such that all of its parts have both high mechanical and electrical strength and are durable in use. In addition, all parts of the spacer should be economical to manufacture and to assemble.

U.S. Pat. No. 4,020,277, issued Apr. 26,1977 to Hendrix Wire & Cable Corporation, the predecessor to the instant assignee, discloses a spacer for aerial cables. The spacer includes a body member having at least one generally arcuate cable retaining means adapted to engage a surface of the conductor cable and retain the cable in a concave seat of the spacer. One end of the cable retaining means is pivotally supported on the body member. Generally arcuate ratchet tooth means are provided adjacent the other end of the cable retaining means. Generally arcuate ratchet tooth means are also provided on the body member outwardly of the concave seat. The teeth of the retainer ratchet tooth means are engageable with the teeth of the body member ratchet tooth means when the retaining means is rotated about its pivotal support, thereby to firmly retain the conductor cable in the concave seat.

However, it has been found that the cable retainer may be dislodged by contact with branches or as the result of force imposed on the retainer due to a short circuit in one of the cables.

While unrelated to aerial cable spacers, there are patents which relate to the more general art of cable clamps. U.S. Pat. No 4,669,688 discloses a cable clamp which, when in a locked position, provides a protrusion with a tooth-like member which is held between a retaining member and an engaging member. U.S. Pat. Nos. 3,516,631, 4,128,918 and 4,609,171 disclose other similar cable clamps.

The structures shown in the above cable clamps are not adaptable to aerial cable spacers. For instance, one common difference from the aerial cable spacers such as shown in U.S. Pat. No. 4,020,277, is that the general cable clamps are limited to clamping cables of one or of a limited size in diameter. The aerial cable spacer of U.S. Pat. No. 4,020,277 is adapted to accommodate a greater range of cable sizes, with ease of replacing the cables and without reducing the effectiveness of the clamping ability of the cable retainer. In addition, the above general cable clamps have intricate components which are not durable for aerial cable spacer applications.

SUMMARY OF THE INVENTION

It is an object of the present invention to provide an aerial cable spacer which overcomes the above noted problems of the prior art.

It is a further object of the present invention to provide an aerial cable spacer having a cable retainer which resists being inadvertently dislodged.

It is still a further object of the present invention to provide an aerial cable spacer having a cable retainer which is not easily dislodged and which accommodates cables of a wide range of sizes.

It is yet a further object of the present invention to provide an aerial cable spacer having a cable retainer which is not easily dislodged and which can be used repeatedly without losing its effectiveness to retain the cable.

Yet a further object of the present invention is to provide an aerial cable spacer having a cable retainer which is not easily dislodged and which is cost effective to manufacture.

Still a further object of the present invention is to provide an aerial cable spacer having a cable retainer which is not easily dislodged and which is durable.

Still yet a further object of the invention is to provide a cable spacer made of the same material as the cable, thereby providing dielectric compatability.

The present invention therefore provides, a device for supporting and spacing aerial cables, the device comprising a main body portion, the main body portion having, a cable seat, a first side adjacent the cable seat, a second side adjacent the cable seat and opposite from the first side, an arcuate shaped protrusion extending along the first side, a plurality of teeth arranged in an arcuate shape along the first side; and a cable retaining arm having a first end pivotally coupled to the second side of the main body portion, a second end having a pawl which pivots about a first arcuate path, the first arcuate path substantially aligned with the plurality of teeth arranged in an arcuate shape, and an abutment surface which pivots about a second arcuate path, the second arcuate path substantially aligned with the arcuate shaped protrusion, the abutment surface slidably engageable with the arcuate shaped protrusion, whereby the cable retaining arm is adapted to engage a surface and arcuate shaped protrusion of a cable, the pawl is locked in a position along the plurality of teeth and the engaging abutment surface prevents the pawl from being inadvertently released from the plurality of teeth.

BRIEF DESCRIPTION OF THE DRAWINGS

FIG. 4 is an elevational view of a cable seat of the body member shown in FIG. 2;

FIG. 5 is a view of the retainer taken along line 5—5 of FIG. 2;

FIG. 6 is a cross-sectional view of the retainer taken along line 6—6 of FIG. 2;

DETAILED DESCRIPTION OF THE PREFERRED EMBODIMENT

Figure 1:
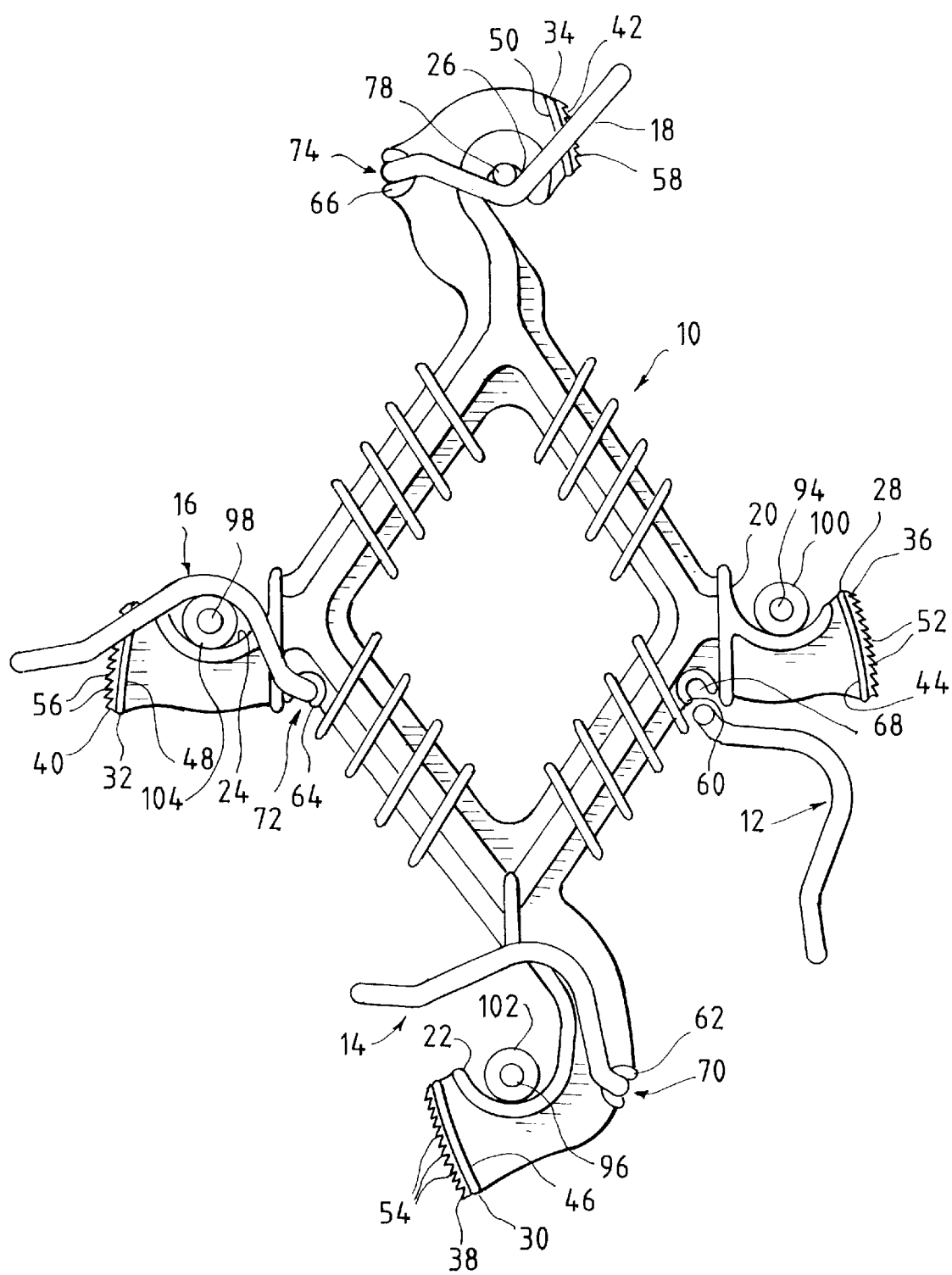
FIG. 1 is an elevational view of an aerial cable spacer, having a plurality of cable retainers, in accordance with the present invention.

In a first embodiment, the spacer shown in FIG. 1 includes the body member 10 and four generally arcuate retaining means 12, 14, 16 and 18. The retaining means 12, 14 and 16 are identical. The retaining means 18 is the same as the other retaining means except that it is narrower, shorter and has one fewer ratchet teeth.

Both the body member 10 and the retaining means 12, 14, 16, 18 are made from a thermoplastic material, the preferred embodiment being a polymer which has a low dielectric constant and has both weather and track resistant qualities.

The body member 10 is provided with three generally concave conductor cable seats 20, 22 and 24 and a generally concave messenger cable seat 26. As can be seen from FIGS. 1 and 4, an arcuate shaped protrusion 28, 30, 32 and 34 is located at one side of each of the concave seats 20, 22, 24 and 26. Each arcuate shaped protrusion 28, 30, 32 and 34 has a far side 36, 38, 40 and 42 facing away from the respective concave seat and a near side 44, 46, 48 and 50 facing towards the respective concave seat. FIG. 3 shows a view of the arcuate shaped protrusion 30 along line 3—3 of FIG. 2.

The body member 10 is provided with four generally arcuate ratchet tooth means 52, 54, 56 and 58 located along the far side 36, 38, 40 and 42 of the respective arcuate shaped protrusion 28, 30, 32 and 34. Each ratchet tooth means 52, 54, 56 and 58 includes a plurality of teeth as shown, for example, in FIG. 4.

Figure 2:
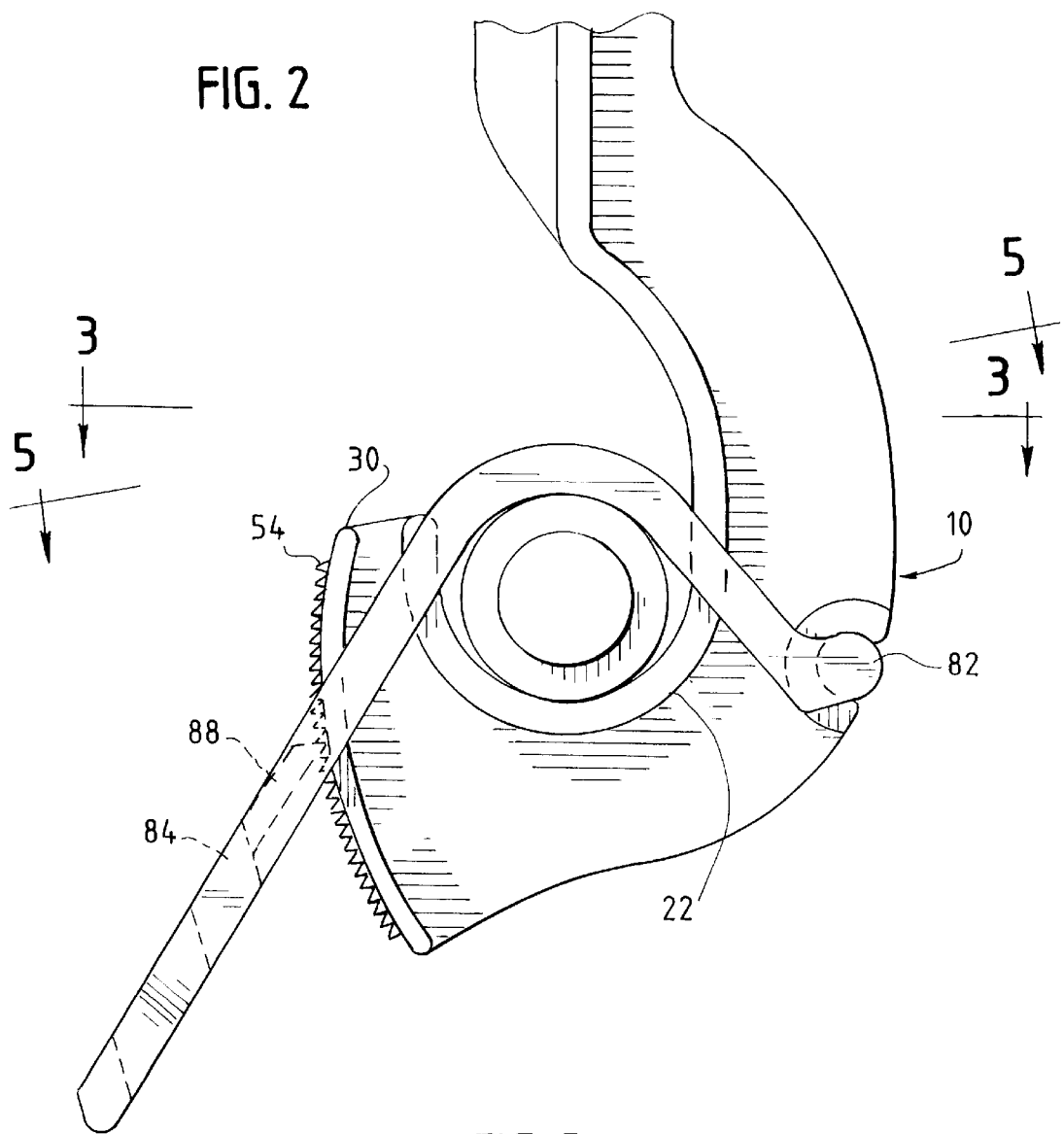
FIG. 2 is an elevational view with phantom lines of a cable retainer of FIG. 1 in accordance with a first embodiment of the present invention.
Figure 3:
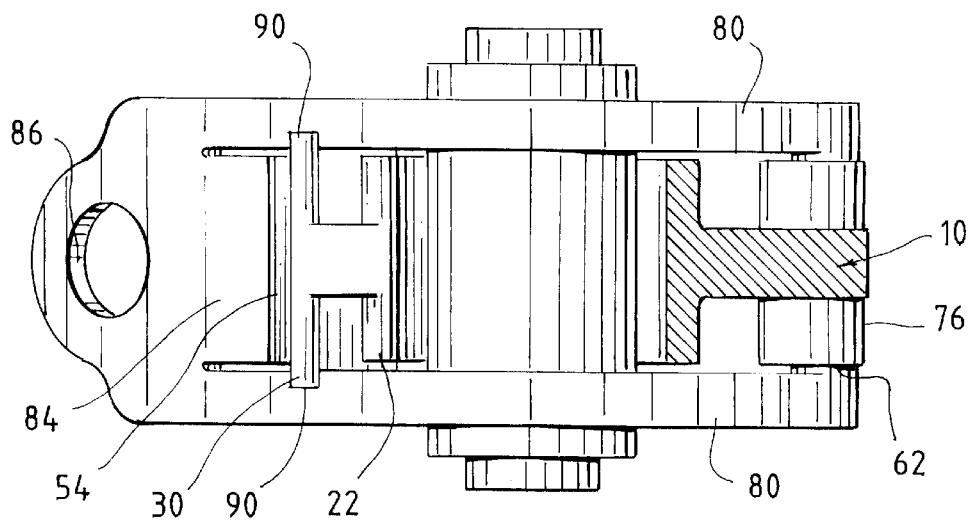
FIG. 3 is a view of the cable retainer taken along line 3—3 of FIG. 2.

The body also comprises semi-cylindrical sockets 60, 62, 64 and 66 (FIG. 1 and 2). The sockets are located adjacent to the sides of the seats 20, 22, 24 and 26 respectively. The sockets are located opposite from the respective body ratchet tooth means 52, 54, 56 and 58. The sockets are provided with slots 68, 70, 72 and 74 which are formed in part by the flanges 76 which form reinforcements for the sockets (see FIG. 4).

Each retaining means 12, 14, 16, 18 comprises a pair of spaced generally arcuate arms 80 (FIGS. 5 and 6), connected together at one end by a generally cylindrical member 82 and at the other end by a transverse member 84. The transverse member 84 is provided with a hole or "perforation 86. The transverse member 84 of the retaining means are also provided with a pawl 88 (see FIGS. 5 and 6) as best seen" in FIG. 6. Each of the arms 80 includes an abutment surface or notch 90, as seen in FIG. 5.

To assemble the parts of the spacer, it is only necessary to snap each of the generally cylindrical members 82 through the slots 68, 70, 72 and 74 and into the respective socket 58, 60, 62 and 64.

To install the spacer, the retaining means are rotated to open positions in which they are temporarily retained because of the snug fit between the generally cylindrical members 82 and the respective socket 58, 60, 62 and 64. The messenger cable seat 26 is then placed over the messenger cable 78 and the retaining means adjacent to it is partially closed to hold the messenger cable in its seat. Then the conductor cables 94, 96, and 98 are positioned in the seats 20, 22 and 24. The conductor cables 94, 96 and 98 are provided with insulating sheaths 100, 102 and 104. The retaining means are each rotated to closed positions so that the pawl engages the respective body member ratchet tooth means, the abutment surfaces or notches engage the respective portions of the arcuate shaped protrusions (see FIGS. 2 and 3), and the curved central portions of the generally arcuate arms 80 firmly contact the conductor cables. Thus the conductor cables are firmly held in their respective seats. The retaining means for the messenger cable is rotated to a fully closed position so that the central portion of its generally arcuate arm 80 firmly contacts the messenger cable thereby to firmly hold it in its seat 26.

The holes or perforations 86 may be used to close and open the retaining means by inserting a screwdriver or other elongate tool and, using the tool as a lever, either to tighten the retaining means with respect to the cable or to pry it open so that it may be rotated to an open position in the event is becomes necessary to repair or replace the cables.

As will be appreciated, the engaging abutment surface or notch 90 and arcuate shaped protrusion 28, 30, 32, 34 prevents the cable retaining means 12, 14, 16, 18 from being inadvertently dislodged.

Figure 7:
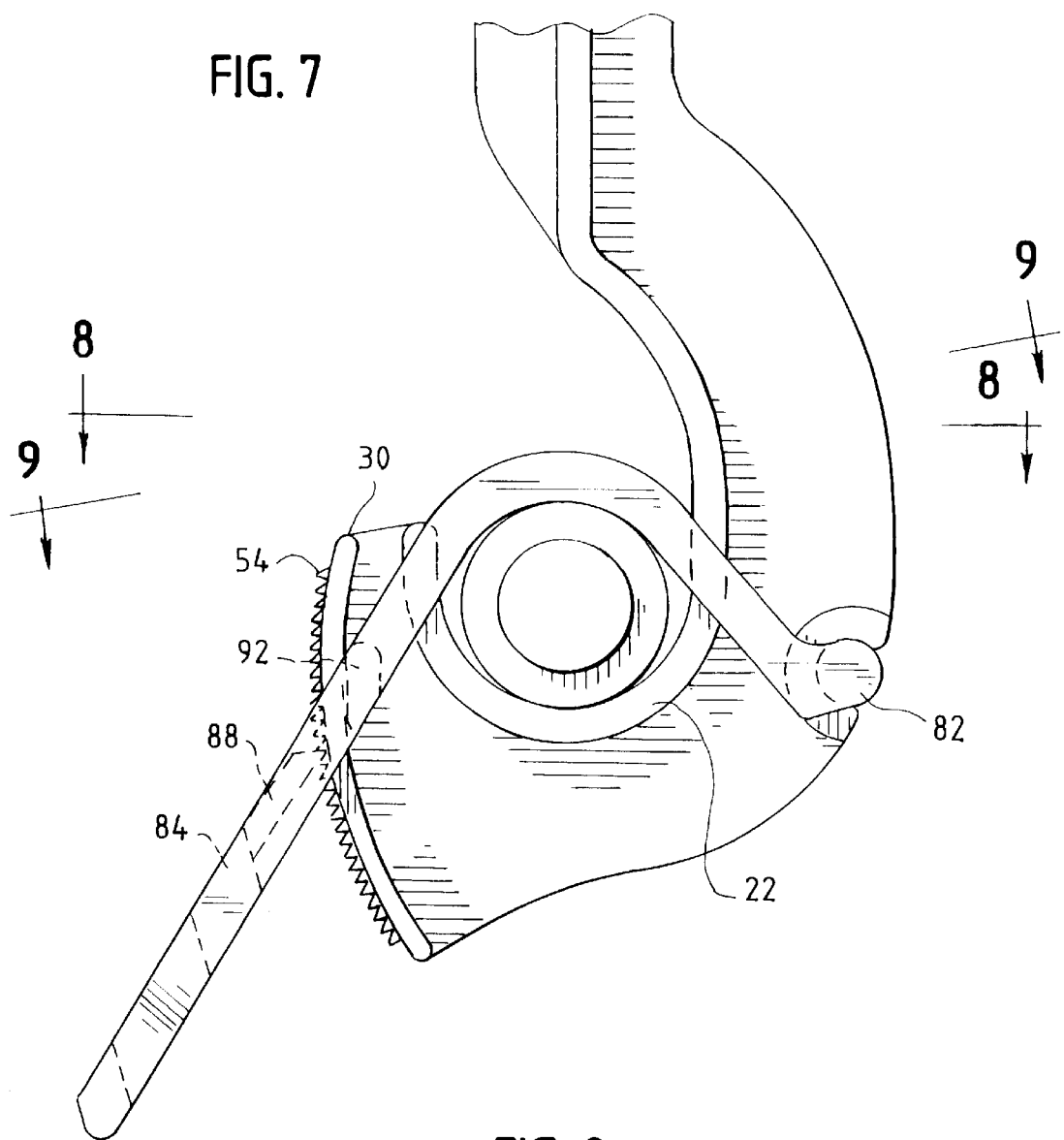
FIG. 7 is an elevational view with phantom lines of a cable retainer of FIG. 1 in accordance with a second embodiment of the present invention.
Figure 8:
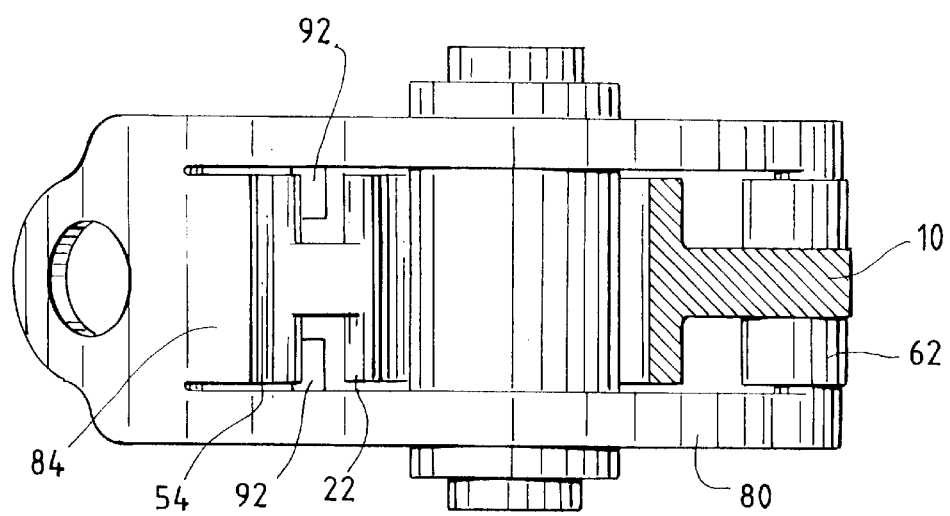
FIG. 8 is a view of the cable retainer taken along line 8—8 of FIG. 7.
Figure 9:
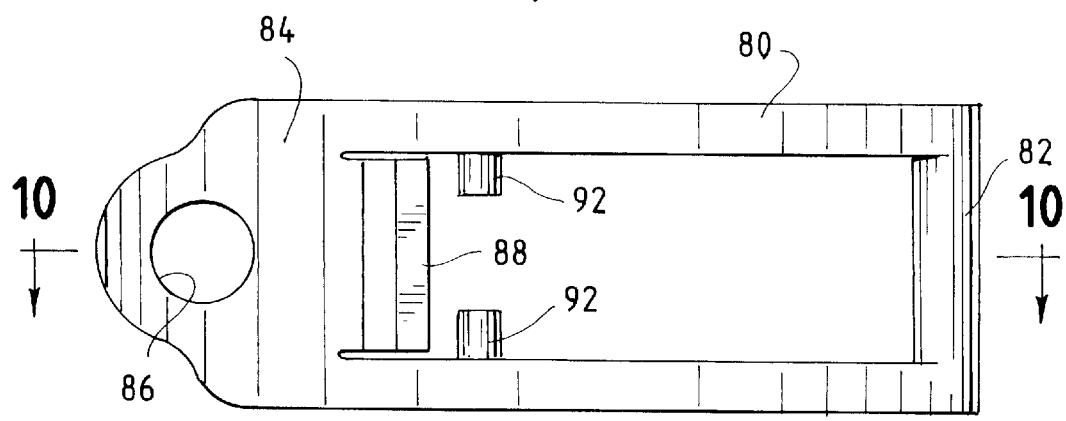
FIG. 9 is a view of the retainer taken along line 9—9 of FIG. 7.
Figure 10:
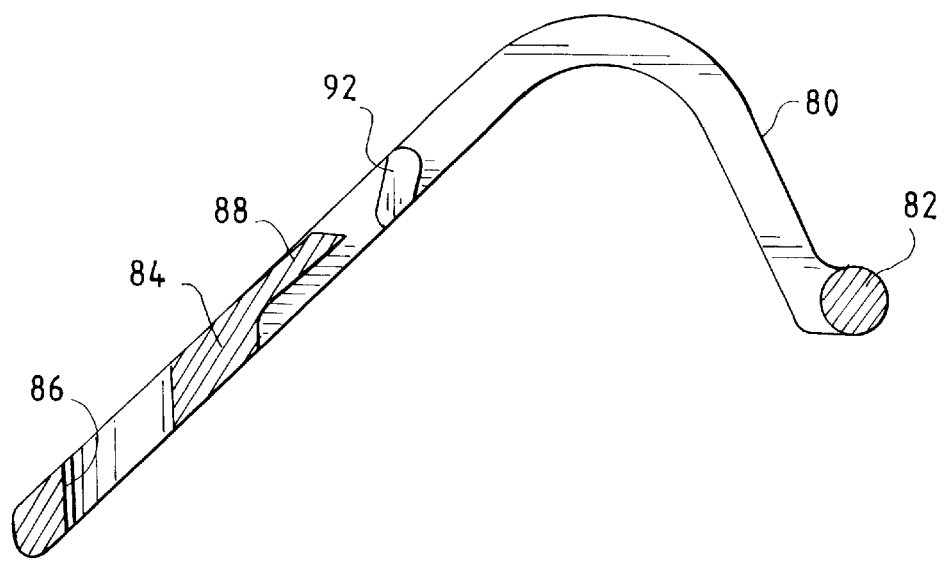
FIG. 10 is a cross-sectional view of the retainer taken along line 10—10 of FIG. 9.

FIGS. 7–10 disclose a cable retainer in accordance with a second embodiment of the present invention. The cable retainer of the second embodiment is identical to the cable retainer of the first embodiment with the following exceptions. As seen from FIGS. 9 and 10, the abutment surface is provided in the form of a pair of tangs 92. The pair of tangs 92 engage the arcuate shaped protrusion 28, 30, 32, 34 as seen in FIGS. 7 and 8.

It will be apparent to persons skilled in the art that a spacer embodying this invention is new, economical to manufacture and assemble and durable in use. It is also free from bushings, sleeves and grommets surrounding the messenger and conductor cables and the spacer can accommodate a wide range of cable sizes. Furthermore, it consists of only three parts, the body 10, three identical retaining means 12, 14, and 16 and one slightly smaller retaining means 18 and all three of these parts are made of the same polymeric material at the same time using a single mold cut. The body and the retaining means are weather and track resistant. In addition, the novel cable retaining means resist forces tending to pull the cables out of their seats.

While a first and second embodiment of a spacer for aerial cables embodying the invention has been shown in the drawings, it is to be understood that this disclosure is for the purpose of illustration only, and that various changes in shape, proportion and arrangement of parts as well as the substitution of equivalent elements for those shown and described herein may be made without departing from the spirit and scope of the invention as set forth in the appended claims.

What is claimed:

1. A device for supporting and spacing aerial cables, the device comprising:
   a main body portion, the main body portion having,
      a cable seat,
      a first side adjacent the cable seat,
      a second side adjacent the cable seat and opposite from the first side, an arcuate shaped protrusion having a radial center point and extending along the first side,
a plurality of teeth arranged in an arcuate shape along the first side; and
a cable retaining arm having,
a first end pivotally coupled to the second side of the main body portion,
a second end, the second end having a pawl which pivots about a first arcuate path, the first arcuate path substantially aligned with the plurality of teeth arranged in an arcuate shape,
a cusped portion located between the first end and the second end for retaining a cable in cooperation with the cable seat, and
an abutment surface, distal to said cusped portion, which pivots about a second arcuate path having the same radial center point as the arcuate shaped portion,
the second arcuate path substantially aligned and adjacent with the arcuate shaped protrusion, the abutment surface slidably engageable and in contact with the arcuate shaped protrusion, whereby the cable retaining arm is adapted to engage a surface and arcuate shaped protrusion of a cable, the pawl is locked in a position along the plurality of teeth and the engaging abutment surface prevents the pawl from being inadvertently released from the plurality of teeth.

2. The device of claim 1, wherein the abutment surface includes a tang extending from the cable retaining arm.

3. The device of claim 2, wherein the tang is spaced apart from the pawl in a direction towards the pivotally coupled first end of the cable retaining arm.

4. The device of claim 2, wherein the arcuate shaped protrusion includes a far side facing away from the pivotally coupled first end of the cable retaining arm and a near side facing the pivotally coupled first end of the cable retaining arm, and the tang is slidably engageable with the near side of the arcuate shaped protrusion, whereby the engaging tang and arcuate shaped protrusion prevent the pawl from inadvertently disengaging from the plurality of teeth.

5. The device of claim 4, wherein the plurality of teeth are arranged along the far side of the arcuate shaped protrusion, whereby rotation of the cable retaining arm causes the tang and pawl to engage the arcuate shaped protrusion from opposing sides so that the engaging tang and arcuate shaped protrusion prevent the pawl from inadvertently disengaging from the plurality of teeth.

6. The device of claim 5, wherein the cable retaining arm is generally arcuate shaped.

7. The device of claim 1, wherein the abutment surface includes a notch in the cable retaining arm, the notch pivotal about the second arcuate path, the notch aligned and adapted to receive the arcuate shaped protrusion, whereby the cable retaining arm is rotated with the notch receiving the abutment surface, the pawl is locked in a position along the plurality of teeth and the engaging notch and arcuate shaped protrusion prevent inadvertent lateral movement of the pawl relative to the plurality of teeth.

8. A device for supporting and spacing aerial cables, the device comprising:
at least one cable retainer, each of said at least one cable retainer having;
a cable seat,
a first side adjacent the cable seat,
a second side adjacent the cable seat and opposite from the first side,
a plurality of teeth arranged in an arcuate shape along the first side,
a cable retaining arm having,
a first end pivotally coupled to the second side, and
a second end, the second end having a pawl which pivots about a first arcuate path, the first arcuate path substantially aligned with the plurality of teeth arranged in an arcuate shape, and
means for preventing relative movement of the pawl with respect to the plurality of teeth while the pawl is in engagement with the plurality of teeth and for preventing the pawl from being inadvertently released from the teeth.

9. The device of claim 8, wherein the relative movement preventing means includes an arcuate shaped protrusion extending along the first side of the cable seat and a tang extending from the cable retaining arm, the tang pivots about a second arcuate path, the second arcuate path is substantially aligned with the arcuate shaped protrusion, the tang is slidably engageable with the arcuate shaped protrusion.

10. The device of claim 9, wherein the arcuate shaped protrusion includes a far side facing away from the pivotally coupled first end of the cable retaining arm and a near side facing the pivotally coupled first end of the cable retaining arm, and the tang is slidably engageable with the near side of the arcuate shaped portion, whereby the engaging tang and arcuate shaped protrusion prevent the pawl from inadvertently disengaging from the plurality of teeth.

11. The device of claim 10, wherein the plurality of teeth are arranged along the far side of the arcuate shaped protrusion, whereby rotation of the cable retaining arm causes the tang and pawl to engage the arcuate shaped protrusion from opposing sides so that the tang prevents the pawl from inadvertently disengaging from the plurality of teeth.

12. The device of claim 8, wherein the relative movement preventing means includes an arcuate shaped protrusion extending along the first side of the cable seat and a notch in the cable retaining arm, the notch pivotal about a second arcuate path, the notch aligned and adapted to receive the arcuate shaped protrusion, whereby the cable retaining arm is rotated with the notch receiving the arcuate shaped protrusion, the pawl is locked in a position along the plurality of teeth and the engaging notch and arcuate shaped protrusion prevent inadvertent lateral movement of the pawl relative to the plurality of teeth.

13. An aerial cable spacer comprising:
a main body portion having a messenger cable retainer and at least one conductor cable retainer, each of the messenger and cable retainers having,
a hook portion extending in a plane and having,
a neck portion extending from the main body portion,
a head portion extending from the neck portion, the head portion forming a concave cable seat,
an end portion extending from the head portion,
an arcuate shaped member secured to the hook portion, the arcuate shaped member having a radial center point and extending in a plane parallel to the plane of the hook portion, the arcuate shaped member provides a convex face and at least one arcuate shaped shoulder, and
a plurality of teeth extending from the convex face,
a cable retaining arm having,
first and second parallel arms, each arm having a first end pivotally coupled to the hook adjacent the concave cable seat and opposite from the end portion and a second end, a cross member having a first end and a second end, each cross member end connected to a respective second end of the first and second parallel arms,
   a pawl extending from the cross member the pawl swings about a first arcuate path, the first arcuate path is substantially aligned with the plurality of teeth, the pawl is engageable with the plurality of teeth, and
   an abutment surface which swings about a second arcuate path having the same radial center point as the arcuate shaped portion, the second arcuate path substantially aligned and adjacent with the arcuate shaped shoulder, the abutment surface engageable and in contact with the arcuate shaped shoulder, whereby the engaging abutment surface and arcuate shaped shoulder prevent the pawl from being inadvertently released from the teeth.

14. The aerial cable spacer of claim 13, wherein the abutment surface includes a tang extending from the cable retaining arm.

15. The device of claim 14, wherein the tang is spaced apart from the pawl in a direction towards the pivotally coupled first ends of the cable retaining arm.

16. The aerial cable spacer of claim 14, wherein the arcuate shaped shoulder includes a concave surface, the convex face faces substantially away from the pivotally coupled first ends of the cable retaining arm and a near side facing the pivotally coupled first end of the cable retaining arm, and the tang is slidably engageable with the concave surface, whereby the engaging tang and concave surface prevent the pawl from inadvertently disengaging from the plurality of teeth.

17. The aerial cable spacer of claim 16, wherein the cable retaining arm is generally arcuate shaped.

18. The aerial cable spacer of claim 13, wherein the abutment surface includes a notch in the cable retaining arm, the notch pivotal about a second arcuate path, the notch aligned and adapted to receive the arcuate shaped shoulder whereby the cable retaining arm is rotated with the notch receiving the arcuate shaped shoulder, the pawl is locked in a position along the plurality of teeth and the engaging notch and arcuate shaped shoulder prevent inadvertent lateral movement of the pawl relative to the plurality of teeth.

19. The aerial cable spacer of claim 18, wherein the cable retaining arm is generally arcuate shaped.

* * * * *